INVENTOR.
ERIC B. ANDER
BY Joseph E Ryan
ATTORNEY

United States Patent Office 2,894,714
Patented July 14, 1959

2,894,714

RESILIENTLY MOUNTED ELECTROMAGNETIC ACTUATOR FOR VALVES AND THE LIKE

Eric B. Ander, Minneapolis, Minn., assignor to Minneapolis-Honeywell Regulator Company, Minneapolis, Minn., a corporation of Delaware Application June 6, 1955, Serial No. 513,299

4 Claims. (Cl. 251—30)

This invention is related to a novel electromagnetic operator and more particularly to an operator in which both the armature and coil move relative to a mounting or base.

The novel electromagnetic actuator is disclosed as an operator for a pressure actuated diaphragm valve which is in turn controlled by a pilot operator. The novel electromagnetic actuator is mounted upon the valve body adjacent the pilot operator and directly controls the pilot operator by means of a lever. The valve and pilot operator may be of any conventional design. The pilot operator is usually of a delicate nature and has only a limited amount of free movement. If the free movement is exceeded the operator can be permanently damaged. In conventional designs the pilot operator is connected to its actuating mechanism through a delicate spring mechanism which acts as a strain relief member. This strain relief mechanism must be adjusted with great care and can easily be disturbed if the unit is roughly handled.

It is an object of this invention to provide an electromagnetic operator that functions as a strain relief mechanism.

It is an additional object of this invention to provide an electromagnetic operator in which the armature and coil move relative to a fixed base as well as relative to each other.

A further object of this invention is to provide an alternating current actuator that reduces the alternating current hum normally associated with actuators having a strain relief mechanism.

Figure 1:
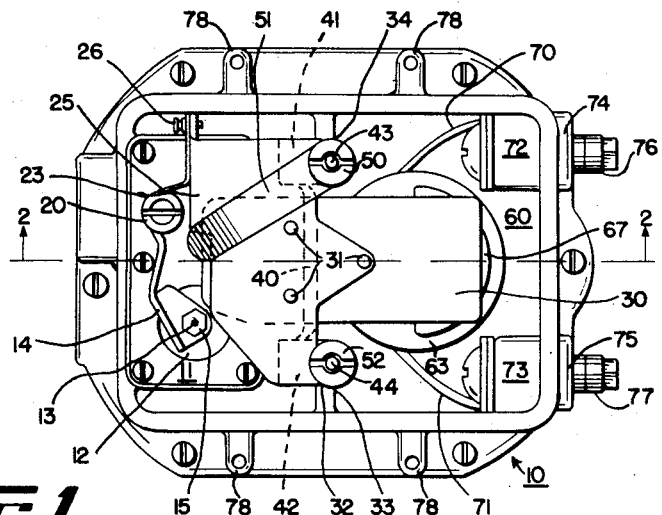
Figure 2:
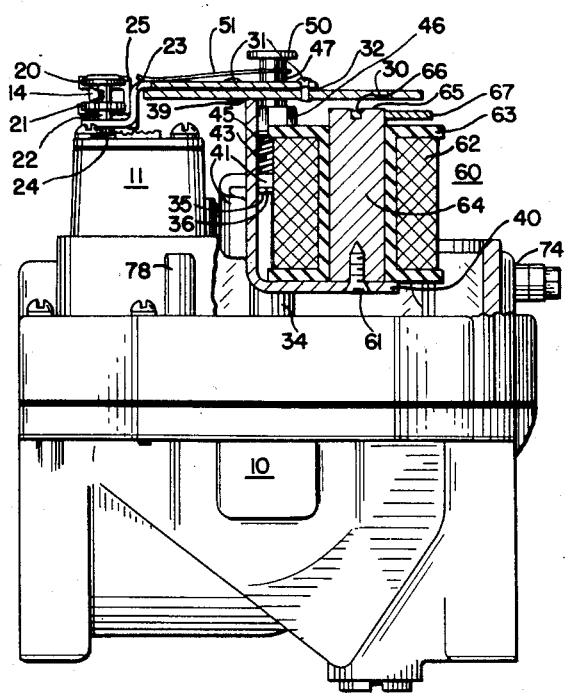

These and other objects will become apparent from consideration of the following specification when considered with the attached drawings, wherein, Figure 1 is a top view of the invention when installed on a diaphragm type valve;

Figure 2 is a partial section along lines 2—2 in Figure 1.

In the embodiment disclosed, a pressure actuated diaphragm valve of conventional design is shown generally at 10. A pilot operator, also of conventional design, is shown generally at 11, and forms part of the upper section of valve 10. Through a flexible diaphragm 12 of the pilot operator there extends a small shaft 13 to which is attached an operating lever 14 as by means of the nut 15. A slight movement of lever 14, in an up or down direction, controls fluid passages (not shown) of pilot operator 11, that in turn operate the pressure actuated diaphragm valve 10. The movement of lever 14 is limited to a rather narrow range and any undue force at either extreme of movement may damage the pilot operator 11.

The lever 14 is restrained between washer-like members 20 and 21 of screw member 22. Screw 22 is held in an armature lever 23 by threads at 24. Also attached to armature lever 23 is a retaining spring 25. The retaining spring 25 may be attached to the armature lever 23 by means such as rivet 26. The spring 25 rests against washer members 20 and 21 of screw 22 to restrain it from moving or rotating after screw 22 has been properly adjusted.

Armature lever 23 is then attached to an armature 30 as by a plurality of rivets 31. Between armature lever 23 and the armature 30 is a thin, flat spring member 32 which is held rigidly in place by the rivets 31. Two support members 33 and 34 are formed integral with the top of valve 10. Each support member forms a post having a flat top as shown at 35 for support 34. It will be understood that while only support member 34 is shown (Figure 2) that support member 33 is identical and the following description applies to it also. On the top of post 34, at 35, is placed a washer 36 which acts as a base for a flange 41 of a magnetic frame 40. A similar flange 42 rests on the top (not shown) of support member 33. Magnetic frame 40 acts as a fulcrum or pivot at 39 for armature 30. Passing through flange 41 and washer 36 is a screw member 43, which has a varying cross section. A similar screw 44 is provided for the post 34. A coil spring 45 is placed around screw 43 and is retained in compression against flange 41 by a projection 46 on the screw member 43. It is understood therefore that the section 46 of screw 43 and the spring 45 exert enough pressure on the flange 41 to hold the frame 40 in a level state except under certain conditions which will be explained below. It is further understood that the structure associated with support 33 and screw 44 is identical in every way to that of support 34 and screw 43.

A circular section 47 of screw 43 extends upward from projection 46 and passes through the spring member 32 to retain the armature 30 in the position generally shown. A nut 50 is then placed on the top of screw member 43 and clamps a leaf spring 51 between the nut 50 and the circular section 47. This arrangement acts to retain the leaf spring 51 so that it can exert a downward pressure on the top of armature lever 23. The support member 33 is again identical to that of 34 with the exception that a nut 52 is placed on the screw 44 but an additional leaf spring is omitted.

Mounted on frame 40, as by screw 61, is a coil generally shown as 60. The coil 60 is of a conventional design of which member 62 is a wound coil on an insulating bobbin 63. The bobbin 63 surroundings a magnetic core 64, which retains screw 61 for rigidly mounting the coil 60 to frame 40. The top of core 64 has a flat pole face at 65 with the exception of a slot 66 which retains a shading ring 67. Two leads 70 and 71 (Figure 1) are taken from coil 60 to two insulated terminals generally shown at 72 and 73. These terminals then extend through portions of valve 10 at 74 and 75 to conventional terminal members 76 and 77. The pilot operator 11 and the balance of the electromagnetic actuator may be protected from damage by placing a cover (not shown) over the entire structure and attaching it to posts 78 associated with valve 10 by any convenient means, such as screws.

Upon energization of the electromagnetic actuator or coil generally shown at 60 by connection of terminals 76 and 77 to an appropriate power source, a magnetic field is established in armature 30, frame 40, and core member 64. In an attempt to reduce reluctance of the magnetic circuit which has been established the armature 30 and core 64 tend to move together. The armature 30 begins to pivot about the fulcrum 39 and at the same time the frame 40 begins to rotate about an axis located between the flanges 41 and 42 and the tops of support members 33 and 34. The armature 30 which pivoting about the fulcrum 39 also carries the armature lever 23 which shifts the position of screw member 22 and operates the lever 14 of the pilot operator. The pilot operating lever 14 then is limited in its travel by its internal construction (not shown) and the armature 30 is thereby stopped from moving any closer to the pole face 65. At this time, however, the coil structure 60 continues to rotate about the axis between the flanges 41 and 42 and the tops of the supports 33 and 34 until the pole face 65 comes into contact with the underside of armature 30.

By allowing the armature to rotate only to the extent that the pilot operator lever 14 will allow and then having the coil assembly 60 complete the movement a strain release mechanism is effected. In addition to operating as a strain relief mechanism this arrangement allows the pole face 65 and armature 30 to come into intimate contact and eliminate any tendency for hum or chatter between the two members. Upon de-energization of the coil winding 62 the spring 45 immediately biases the frame 40 back to a level condition and spring 51 biases the armature 30 and armature lever 23 back to their most counterclockwise positions. By adjustment of screw 22 the armature lever 23 and armature 30 are positioned to establish pull-in characteristics and tensions on the pilot operator 11 such that its operation is reliable while yet not allowing a rotation of such a magnitude as to damage its internal construction.

It is obvious that the novel arrangement of the armature, and pivotally mounted frame and coil, can be easily applied to numerous types of devices. The disclosure presented was illustrative only and I wish to be limited by the scope of the appended claims.

I claim as my invention:

1. An electric operator of the class described: a base; an operated device mounted upon said base; an electromagnetic actuator including a coil and a magnetic frame; armature means including connection means having a resilient member operatively connected to said device and pivotally supported on said frame; resilient mounting means on said base to support said frame; and said device including the resilient member and the resilient mounting means exerting substantially the same relative restraining torques on said frame and said armature means; said frame and said armature means moving substantially simultaneously toward each other and relative to said base to operate said device upon energization of said coil.

2. An electric operator of the class described: mounting means; an operated device mounted upon said means; an electromagnetic actuator including a coil and a magnetic frame; an armature including connection means having a resilient member operatively connected to said device and pivotally supported on said frame; a spring on said mounting means to support said frame; and said device including the resilient member and the spring exerting substantially the same relative restraining torques on said frame and said armature means; said frame and said armature means moving substantially simultaneously toward each other and relative to said mounting means to operate said device upon energization of said coil.

3. In a device of the class described: a valve including operating means having resilient bias means; an electromagnetic actuator including a coil and a magnetic frame; armature means having connection means including said resilient bias means connected to said operating means; said armature means being pivotally supported on said frame; resilient mounting means on said valve to support said frame; and said operating means including the resilient bias means and the resilient mounting means exerting substantially the same relative restraining torques on said frame and said armature means; said frame and said armature means moving substantially simultaneously toward each other and relative to said valve to operate said valve upon energization of said coil.

4. In a device of the class described: a pressure actuated diaphragm valve including a pilot operator having a bias spring; an electromagnetic actuator including a coil and a magnetic frame; an armature having connection means including said bias spring connected to said operator; said armature pivotally supported on said frame; a mounting spring on said valve supporting said frame; and said operator including the bias spring and the mounting spring exerting substantially the same relative restraining torques on said frame and said armature; said frame and said armature moving simultaneously toward each other and relative to said valve to operate said valve upon energization of said coil.

References Cited in the file of this patent

UNITED STATES PATENTS

| 1,331,290 | Stratton | Feb. 17, 1920 |
| 1,980,393 | Evans | Nov. 13, 1934 |
| 2,169,696 | Hotchkiss | Aug. 15, 1939 |
| 2,271,993 | Stoddard | Feb. 3, 1942 |
| 2,299,286 | Wantz | Oct. 20, 1942 |